United States Patent
Guo et al.

(10) Patent No.: US 9,923,992 B2
(45) Date of Patent: Mar. 20, 2018

(54) INTER-PROCESS COMMUNICATION METHOD BASED ON APPLICATION LAYER OF ANDROID AND BASIC APPLICATION COMMUNICATION SYSTEM

(71) Applicant: SHENZHEN CHUANGWEI-RGB ELECTRONIC CO., LTD., Shenzhen, Guangdong (CN)

(72) Inventors: Shangfeng Guo, Guangdong (CN); Weilong Lv, Guangdong (CN)

(73) Assignee: SHENZHEN CHUANGWEI-RGB ELECTRONIC CO., LTD., Shenzhen (CN)

( * ) Notice: Subject to any disclaimer, the term of this patent is extended or adjusted under 35 U.S.C. 154(b) by 199 days.

(21) Appl. No.: 14/906,563

(22) PCT Filed: Mar. 17, 2014

(86) PCT No.: PCT/CN2014/073496
§ 371 (c)(1),
(2) Date: Jan. 21, 2016

(87) PCT Pub. No.: WO2015/135221
PCT Pub. Date: Sep. 17, 2015

(65) Prior Publication Data
US 2016/0344846 A1 Nov. 24, 2016

(30) Foreign Application Priority Data
Mar. 12, 2014 (CN) .......................... 2014 1 0090696

(51) Int. Cl.
*G06F 15/16* (2006.01)
*H04L 29/06* (2006.01)
(Continued)

(52) U.S. Cl.
CPC ................ *H04L 67/42* (2013.01); *G06F 9/54* (2013.01); *H04L 67/16* (2013.01); *H04W 4/001* (2013.01); *H04W 4/003* (2013.01)

(58) Field of Classification Search
CPC ........ H04L 67/16; H04L 67/42; H04W 4/001; H04W 4/003; G06F 9/54; G06F 9/455
(Continued)

(56) References Cited

U.S. PATENT DOCUMENTS

2011/0093836 A1* 4/2011 Galicia ................... G06F 9/441
717/139
2012/0081383 A1* 4/2012 Reeves ............... H04L 67/1095
345/582

(Continued)

FOREIGN PATENT DOCUMENTS

CN 102833080 A 12/2012

OTHER PUBLICATIONS

International Search Report of PCT Patent Application No. PCT/CN2014/013496 dated Dec. 22, 2014.
(Continued)

*Primary Examiner* — Frantz Jean

(57) ABSTRACT

Disclosed in the present invention are an inter-process communication method based on an application layer of Android and a basic application communication system. In accordance with a client/server communication mode, frame encapsulation applications for the mutual communication between system-level applications and user applications are created and virtualized as a client side; a daemon process IPC Service is created and virtualized as a server side; registration and binding of the IPC Service are completed through the applications, so as to achieve mutual communication among every application. Through the adoption of the technical solution of the present invention, a special
(Continued)

communication mechanism can be rapidly and safely built during the inter-process communication of every application.

13 Claims, 4 Drawing Sheets

(51) Int. Cl.
    *H04W 4/00*       (2018.01)
    *G06F 9/54*        (2006.01)
    *H04L 29/08*      (2006.01)

(58) Field of Classification Search
    USPC .......................... 719/312, 313, 203; 709/203
    See application file for complete search history.

(56) References Cited

U.S. PATENT DOCUMENTS

| | | | |
|---|---|---|---|
| 2013/0283298 A1* | 10/2013 | Ali | G06F 9/5077 719/319 |
| 2014/0115580 A1* | 4/2014 | Kellerman | G06F 9/455 718/1 |
| 2015/0150025 A1* | 5/2015 | Yuen | G06F 9/54 719/312 |

OTHER PUBLICATIONS

1st Office Action of counterpart Chinese Patent Application No. 201410090696.1 dated Jul. 26, 2016.
Ruyan Wang et al., Analysis and Research about Binder IPC Under Android, Computer Technology and Development, Sep. 30, 2012, pp. 107-110, vol. 22, No. 9.

* cited by examiner

| from | to | cmd | priority | needack |
|------|----|----|----------|---------|
| body ||||||
FIG. 5
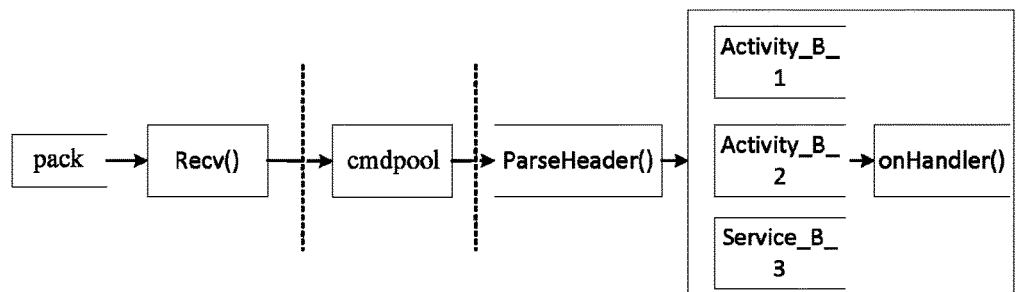
FIG. 6
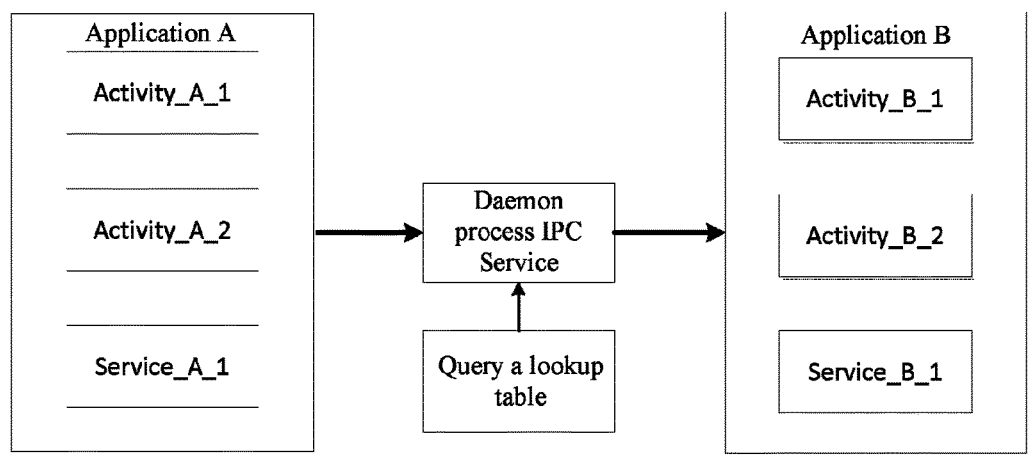
FIG. 7

INTER-PROCESS COMMUNICATION METHOD BASED ON APPLICATION LAYER OF ANDROID AND BASIC APPLICATION COMMUNICATION SYSTEM

BACKGROUND

Technical Field

The present invention relates to the field of data communication, and more particularly to an Android-based communication technology for applications.

Related Art

With the rapid development of science and technology, Android devices like smart phones are emerging and developing rapidly. Since its advent, the Android system has gradually gained market share due to its obvious advantages. In China, the application of the Android system is no longer limited to the mobile phone industry, and has been rapidly extended to relevant fields, for example, of tablets, in-vehicle systems, television STB, intelligent appliances, and intelligence conference systems.

However, for developers and Internet companies that adopt the Android system, they shall not be satisfied with various applications that are developed based on the native Android system, but also need to further customize Android systems having special characteristics of their own. Especially for television manufacturers, it is very important to have a unique system, with which they can quickly adapt to the iteration and upgrade of chips. Therefore, how to customize and create a system that can be used for upper-layer development becomes a priority problem to be resolved by those manufacturers.

To create a set of system-level applications based on Android or customize an Android system having special characteristics, it is inevitable to use a communication method such as an inter-process communication method. It is known that on the Android system, there are only two communication methods for applications: Binder mechanism and SOCKET communication mechanism. At present, most television manufacturers adopt only the Binder mechanism or the SOCKET mechanism, or even a broadcast mechanism, which, however, has some deficiencies and cannot completely meet the requirements of an open platform-based system.

Use of the SOCKET mechanism can reduce the coupling of various resource modules, so that an independent module can implement an independent resource interface. In this way, the system can still run normally after a module collapses. However, the universality of the SOCKET interface results in low transmission efficiency and high overloads, and the SOCKET interface is not suitable for real-time communication among multiple processes, but is more suitable for data transmission and communication among different machines. In addition, when the SOCKET mechanism is used, each modules needs a port number in order to implement communication; in this case, when third-party applications are integrated, port numbers needs to be assigned, and if system applications need to communicate with the third-party application, the system applications need to obtain the port numbers of the applications in order to implement communication, which greatly impedes the development of software platforms and integration of abundant third-party applications. Based on the above, the mechanism of creating system-level applications by using the SOCKET mechanism has obvious deficiencies.

When the Binder mechanism is used, because only the Binder mechanism and an AIDL callback method are used, upper-layer applications bundle all module functions to one service process in order to normally call all available resource interfaces, leading to excessively tight coupling of the system. Once the core service process that provides resource interfaces dies, the whole system can no longer work, which causes great inconvenience to the user, leading to poor user experience.

SUMMARY

A main objective of the present invention is to provide an Android-based communication solution for applications.

In view of this, first, the present invention provides an inter-process communication method based on an application layer of Android, where frame encapsulation applications for mutual communication between system-level applications and user applications are created and virtualized as a client side; a daemon process IPC Service used for an inter-process communication service is created and virtualized as a server side; and the applications are registered with and bound to the IPC Service, so that the applications implement mutual communication among the applications by using the IPC Service.

Next, the present invention provides an Android-based basic application communication system, including:

applications, being frame encapsulation applications for mutual communication between system-level applications and user applications, and virtualized as a client side;

a daemon process IPC Service, used for an inter-process communication service, and virtualized as a server side, where the applications are registered with and bound to the IPC Service, so that the applications implement mutual communication among the applications by using the IPC Service.

Then, the present invention provides an intelligent terminal, which uses the foregoing inter-process communication method based on an application layer of Android or the foregoing basic application communication system, to implement mutual communication among applications.

In addition, the present invention provides an intelligent television terminal, including the foregoing Android-based basic application communication system built therein.

At last, the present invention provides an electronic data carrier, including a computer program stored therein to implement the foregoing inter-process communication method based on an application layer of Android.

The communication solution for Android applications of the present invention consists of specific applications and a daemon process. A special communication mechanism can be rapidly and safely built during the inter-process communication of every application of the Android system, which not only brings more convenience to the communication of system applications, but also imparts the system with simplicity and openness so that third-party applications can be easily and conveniently integrated and free developers are also given a great convenience in developing applications on the system platform; in this way, not only are the applications of the system platform enriched, but the cost of application development can also be lowered.

By means of the communication solution based on Android applications of the present invention, a special communication mechanism can be rapidly and safely built among applications on the Android system, so that not only communication among application processes can be implemented, but also the communication can be accurate to an activity or service of an application, making the inter-process communication simpler and easier to use. In addition, the communication system implemented by using this solution makes it quite easy to develop applications, and applications can be presented to the user in the form of a system or suite rather than individual Android applications; in this way, the applications are more organized, and the user will not have a feeling that there are too many unorganized applications.

BRIEF DESCRIPTION OF THE DRAWINGS

FIG. 5 is a schematic structural diagram of a data packet structure according to an embodiment of the present invention;

FIG. 6 is a schematic flowchart of receiving data according to an embodiment of the present invention;

FIG. 7 is a schematic flowchart of sending data according to an embodiment of the present invention;

DETAILED DESCRIPTION

The present invention is described below in further detail through specific embodiments and with reference to the accompanying drawings.

Interpretation of technical terms: Application, which mainly refers to a specific application or an Android application object, and in this specification, mainly refer to frame encapsulation applications for mutual communication between system-level (that is, basic applications on which user applications can be developed) applications and user applications.

Application layer, including applications and IPC Service.

IPC Service, which is a daemon process, and is used for an inter-process communication service.

ActivityAndroid, which is an application component, and provides a screen for interaction with a user.

Service, which is one of Android components, and is an application component that has no user interface and that executes a time consuming operation in the background.

ServiceManager, which is an important process of Android, and is used to manage services in the system.

Figure 1:
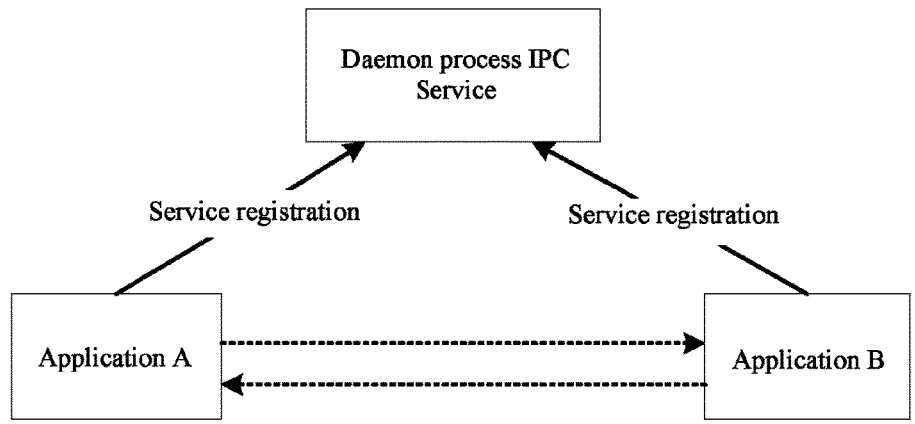
FIG. 1 is an overview diagram of system communication of a basic application communication system according to the present invention.

The present invention adopts a client/server (C/S) communication mode. Referring to an overview diagram of system communication in FIG. 1, its general architecture consists of two parts: applications and IPC Service, where the applications are registered with the IPC Service, and then implement mutual communication among the applications.

Embodiment 1

An inter-process communication method based on an application layer of Android according to this embodiment is implemented by creating an Android-based basic application (generally referring to all system applications and user applications) communication system, and includes the following steps:

First, frame encapsulation applications for mutual communication between system-level applications (that is, basic applications on which user applications can be developed) and user applications are created, to implement important steps such as service binding, object saving, data sending and data receiving.

Figure 2:
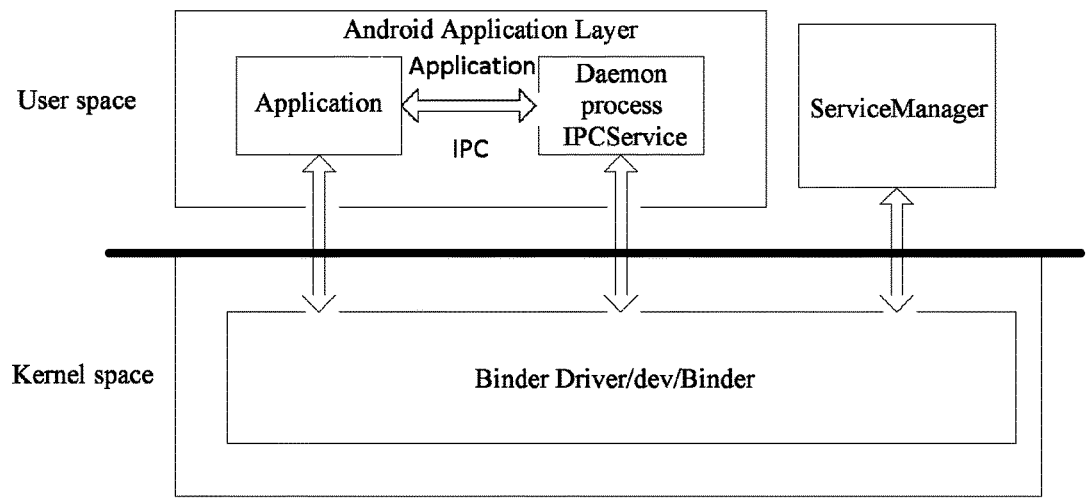
FIG. 2 is a schematic diagram of a Binder mechanism according to the present invention.
Figure 3:
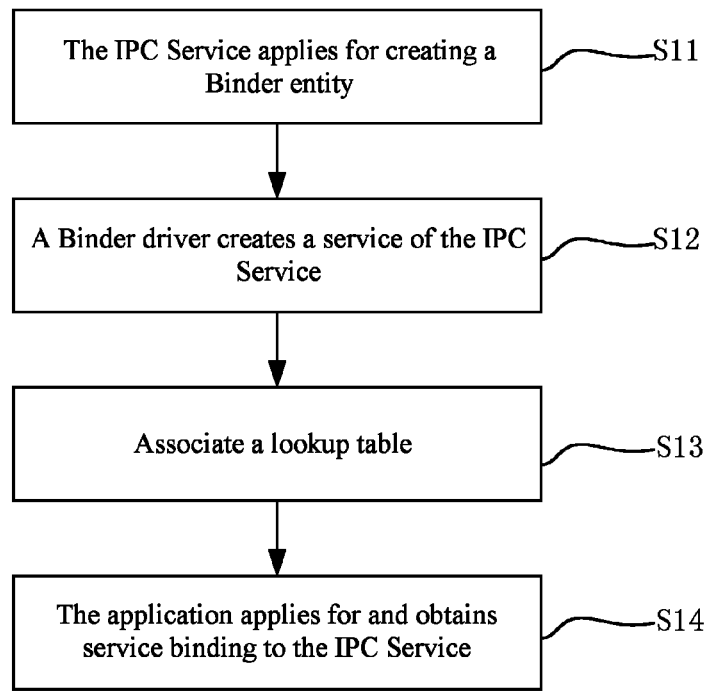
FIG. 3 shows a process of binding applications to a service of an IPC Service according to an embodiment of the present invention.

1. Service binding, which mainly refers to that when an activity and a service are in oncreated( )(which is one of seven arguments related to the lifecycle, is executed when an activity is started for the first time, and is mainly used to initialize some variables), the application layer sends a request to ServiceManager to apply for a service of the IPC Service. Referring to FIG. 2 and FIG. 3, the Android Binder mechanism is used.

S11. The IPC Service applies for creating a Binder entity. First, the IPC Service applies, in its own process, to a Binder driver for creating a Binder entity of the IPC Service.

S12. The Binder driver creates a service of the IPC Service. The Binder driver creates, for the IPC Service, a Binder entity node and a Binder reference for the IPC Service in a kernel, that is, instructs ServiceManager to register a service that is called the IPC Service and used for the inter-process communication service.

S13. Associate a lookup table. After receiving a data packet, ServiceManager extracts a name and reference of the IPC Service from the data packet, and fills the name and reference into a lookup table.

S14. The application applies for and obtains service binding to the IPC Service. The application initiates a request to ServiceManager to apply for a service of the IPC Service, so that ServiceManager can find, in the lookup table, a reference of the IPC Service, and the IPC Service returns the Binder reference to the application.

2. Object saving. As shown by the dashed-line block in the registration mechanism in FIG. 4, after the service binding succeeds, the application layer saves instance objects inheriting from SkyActivity and SkyService into a correspondence table, so that when data is received, the data can be distributed to specific activities and service objects. By saving specific instance objects, data can be accurately transmitted to specified activities and specified services of specified applications, thereby implementing a logic structure for accurate transmission and communication.

In this embodiment, two tables are used. Specifically, each application saves a correspondence table, which is a set of services and activities of the application. For the IPC Service, there is one lookup table for each communication platform, and references of all applications of the platform are recorded in the lookup table. This solution cannot be found in the prior art. In the prior art, although Android can implement communication from activities to activities or services, it has obvious deficiencies: inter-process communication is implemented, a table recording a correspondence between processes is used, and if there is multiple services and activities in one process, communication to a specific service or activity cannot be implemented; as a result, only point-to-point communication can be implemented, and communication data can only be a basic data structure (int, string, list, or the like). In this embodiment, after specific instance objects are saved, which is equivalent to placing all the applications to one communication platform, not only point-to-point communication can be implemented, but also communication among points can be implemented.

In the prior art, the user of Binder during inter-process communication requires that a returned reference should be IBinder. If an application A needs to communicate with an application B, the application A needs to save IBinder of the application B; if the application A also needs to communicate with an application C, the application A also needs to save IBinder of the application C. The more points the application A needs to communicate with, the more times of binding the application A needs to perform, and the more references are saved. In addition, if these applications need to communicate with one another, each application needs to save all references except those of the application itself, which is rather complicated. Moreover, limited by the interface of the Binder mechanism, the structure of communication data is limited to basic data structures of Android communication, and mostly the string structure is used for communication.

The core of the Binder mechanism lies in communication of two processes or two components. After the encapsulation of the present invention is adopted, the present invention becomes platform-oriented, and can implement mutual communication among multiple points for upper-layer applications while greatly reducing the complexity of development of upper-layer applications. In the present invention, after a byte stream is directly used, a user can use any data structure, as long as the two parties of communication can perform normal serializing and deserializing. Moreover, many complex data structures of Java also support byte serializing and deserializing, the performance loss caused by conversion of the data structure to strings can be greatly reduced.

3. Data sending. The application encapsulates data to be communicated into a data structure shown in FIG. 5, which mainly consists of a header and a body. The header mainly includes the following fields: from, to, cmd, priority, and needack. The body is mainly a byte stream of a message. The meanings of the fields of the header are as follows:

3.1. from, which mainly includes a package name and an activity or service name of a data sender, and is automatically assembled and acquired by the application layer. A specific user does not need to pay attention to it.

3.2. to, which mainly refers to that data needs to be sent to an activity or service in a package, and an argument is transmitted by a specific user that implements a sending command 3.3. cmd, which is mainly a protocol used by two parties to communicate, represents an agreed meaning, and is specifically a string.

3.4. priority, which mainly represents a priority of a command, and distinguishes a priority when the IPC Service processes a command 3.5. needack, which is an identifier indicating whether an instant reply is needed, and indicates whether a result (a label of communication) needs to be immediately returned for the command After the application assembles data, because the Binder reference of the IPC Service is already obtained during the service binding, the application can directly send an assembled data packet to the IPC Service, and then the IPC Service processes and forwards the data packet. In addition, in the present invention, data is re-encoded and compressed by using a byte stream form, and on a communication interface of the application that is open to the outside, if the application needs to perform communication, the application can directly transmit the byte stream. In the prior art, most external interfaces use strings or an agreed data structure, which is not universal and flexible enough. Using byte as the basic transmission unit, a user (that is, user that employs the communication) has the right to determine the data structure and the serializing method. If a fixed data structure that is used restricts the requirements of the user on operations such as serializing, after the byte stream is made open to the user, the user can determine the specific serializing and deserializing methods as required, instead of having to adopt Java serializing, Android serializing, or other self-defined serializing. Therefore, the user can use more types of data structures, and is no longer limited to the basic data structures, avoiding the communication mode using a fixed data structure.

4. Data receiving. As shown by the data receiving mechanism in FIG. 6, after receiving a data packet, the application layer places the received data packet into a command pool. The command pool is an encapsulation of an existing Java thread pool, and is mainly used to implement control and processing of requests. The command pool is specially used for processing received data packets. A thread continuously acquires data packets from the command pool, parses headers of the data packets, obtains, according to specific activity names or service names, specific activity instances from the previously stored correspondence table, and then sends the specific data packets to the specific activity instances for processing.

Then, a daemon process IPC Service is created, which is used as a core service for processing and forwarding data packets. Although it is located in user space from the perspective of the Android architecture, it is invisible to the user. The user does not need to pay attention to specific transactions that the IPC Service needs to handle. It mainly includes two functions.

On the one hand, the IPC Service manages services provided all applications, that is, Binder references of data received by all the applications. When managing all the application services, the IPC Service saves package names of all communication applications, and maps the package names of the applications to Binder references on a one-to-one basis to form a lookup table, so as to implement any package-to-package communication. This greatly facilitates the integration and development of third-party applications, because the application range of the present invention is not limited to communication of system applications that already exist, but is greatly extended to applications that use the framework, regardless of whether the applications are self-developed or integrated by a third party.

On the other hand, the IPC Service responds to requests of all the applications and assigns corresponding services to the applications. When receiving the request of the application, the IPC Service acquires a requested Binder reference according to the package name, then calls an interface of the Binder, and forwards data.

In this way, a data sending procedure is realized, as shown in FIG. 7.

It is assumed that an application A sends data to an application B. When receiving a request from the application A, the IPC Service processes a header of the received data packet, parses out an object to which the data packet is to be sent, that is, the application B, and then acquires a Binder reference of the application B from a stored lookup table, and calls the reference of the application B, thus sending data to the application B. If the object to which the data packet is to be sent cannot be found in the lookup table, it indicates that the application B has not been started, and in this case, the data packet may be discarded directly, because all application that inherit from this communication mechanism will initiate registration and service binding to the IPC Service when being started.

After the communication mechanism provided by this solution, the requests from the applications can be managed easily. In addition, the applications only need to establish a connection to the IPC Service when being started, so that the function of the IPC Service can be implemented with a quite short time.

Based on the above, the communication solution based on system-level applications of Android according to this embodiment consists of specific applications and a daemon process, which resolves the disadvantages in inter-process communication of applications on the Android system. A special communication mechanism can be rapidly and safely built among applications on the Android system, so that not only communication among application processes can be implemented, but also the communication can be accurate to an activity or service of an application, making the inter-process communication simpler and easier to use. In addition, the communication system implemented by using this solution makes it quite easy to develop applications, and applications can be presented to the user in the form of a system or suite rather than individual Android applications; in this way, the user will not have a feeling that there are too many unorganized applications. On the communication system implemented based on this solution, a special system having special characteristics is imparted with simplicity, openness and high scalability, making it an open platform, rather than an individual system.

Embodiment 2

The solution according to Embodiment 1 is specifically applied to a reconstructed version of Tianci system, a Skyworth's intelligent television operating system. Details are given below.

Figure 4:
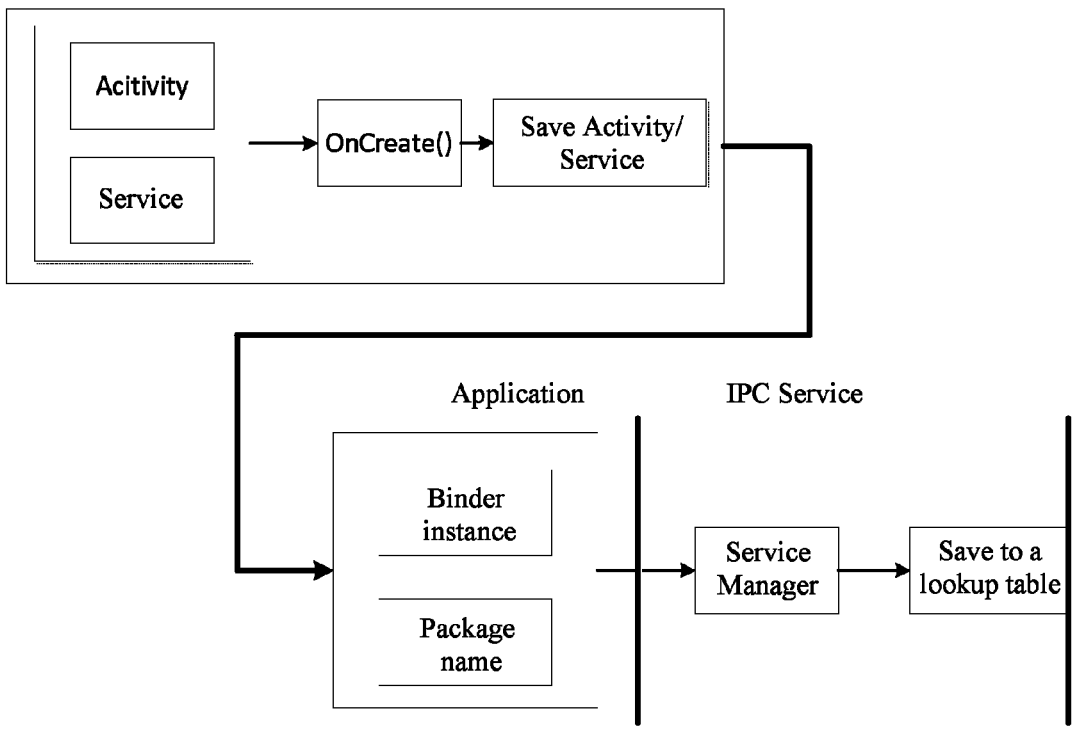
FIG. 4 is a schematic diagram of a registration mechanism according to an embodiment of the present invention.
Figure 8:
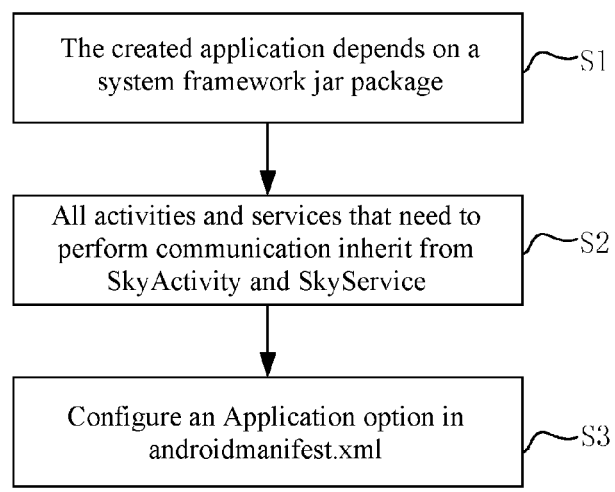
FIG. 8 is a flowchart of communication between activities and services according to an embodiment of the present invention.

First, a global application is implemented, which is contained in the framework layer and encapsulated into a jar package. A global singleton MyApplication that inherits from Application is compiled. Because natives applications cannot be modified directly in the application layer, and modification violates the requirement of Android on openness and universality, creating MyApplication that inherits from Application is to meet requirements on generality and specificity of objects, and the created MyApplication is an ordinary Android application and also meets communication requirements. MyApplication implements encapsulation of the communication framework layers, which mainly includes important steps such as service binding, object saving, data sending and data receiving. Specific implementation solutions of the steps are as described in Embodiment 1. FIG. 4 shows a complete processing procedure of communication of the whole application layer:

when an activity and a service are in OnCreate( ) they are initialized and saved into a correspondence table by the application. If the application A has two activities and three services, the stored correspondence table is as shown below. All the activities and services of the application are stored in two hash maps, to form a correspondence table of the application, which contains package names and class names (the positions of key and value are interchangeable) of all basic components of the application.

| Value | key | Application |
|---|---|---|
| Activity1 | Class name of Activity1 | Application |
| Activity2 | Class name of Activity2 | |
| Service1 | Class name of Service1 | |

The table records all activities and services that are created in this process and need to perform communication. When the activities and services are initialized, the application uses its own instance package name as an argument, and sends a request to ServiceManager to apply for a service of the IPC Service; after receiving the request, ServiceManager returns a reference of the IPC Service to the application. In this case, the IPC Service saves the reference of the binder (that is, the application) into a lookup table, where the table contains information such as a package name and a provided service of the binder. In the following, hashmap<Strng, ICmdReceiver> consisting of ICmdReceiver interface instances returned by a binder application corresponding to a package name forms a lookup table in the IPC Service.

| Key | Value |
|---|---|
| com.test.test1 | Test1: Implementation of ICmdReceiver of Application |
| com.test.test2 | Test2: Implementation of ICmdReceiver of Application |
| com.test.test3 | Test3: Implementation of ICmdReceiver of Application |

The reason why the encapsulation of the communication framework is implemented in the application layer is because based on Android, when the first component of an application runs, a process is created for the application, and first the specified application is instantiated; in this case, service binding to the IPC Service is performed, so as to implement communication between the application and the IPC Service.

Then, a daemon process of the IPC Service is implemented.

A service of a daemon process is created, which provides registration and Binder references for data sending. Then, a Binder lookup table having all registered application stored therein is created. Finally, a corresponding Binder reference is acquired from the lookup table according to a header of a data packet, so as to implement data forwarding.

Through the foregoing steps, a basic communication framework system is implemented. In this way, the work of specific basic applications or user applications is simplified, and communication among activities and services in the whole system can be implemented by performing three simple steps.

S1. The created application depends on a system framework jar package.

S2. All activities and services that need to perform communication inherit from SkyActivity and SkyService.

S3. Configure an Application option in androidmanifest.xml, where name is followed by a path of the application in the framework jar package, as shown below:

<application android:name="a.b.c.MyApplication"></application>

Through the foregoing three simple steps, data packets can be processed and transmitted/received in any class that inherits from SkyActivity and SkyService, and blocking invocation and non-blocking invocation can be implemented. A main procedure of blocking invocation is to send a command and data to a receiver, and synchronously wait for a return from the receiver after processing; in this case, the thread of the sender is blocked until a return of the invocation. For the non-blocking invocation manner, when a command and data are sent to the receiver, the command is first processed by a thread in the framework, and the sender does not wait for a return of the command; the thread pool in the framework sequentially sends all commands in the thread pool to the receiver for processing according to priorities and time of the commands Based on the above, in this embodiment, the present invention is applied to the reconstruction and optimization process of the Tianci system. In addition, the solution provided by the present invention cannot only be applied to televisions, but also can be applied to any Android-based system to perform inter-process communication and in-depth development and systematic development of the system. Furthermore, in this solution, further encapsulation and innovation are carried out based on the communication mechanism of the Android system, which makes it easier for the development of applications, and also facilitates the differentiated work for applications of different platforms, thereby achieving the objective of providing a simple, universal platform and diversified applications. To sum up, this solution provides simplicity and openness for communication among applications of the system.

Embodiment 3

This embodiment provides an intelligent terminal, including a program embedded therein to implement the inter-process communication method based on an application layer of Android or the basic application communication system according to Embodiment 1. By running the program, mutual communication among applications in the intelligent terminal can be implemented. This provides simplicity and openness for communication among applications of the system and facilitates the development of third-party applications, thereby achieving the objective of providing diversified applications. The intelligent terminal includes, but is not limited to, an intelligent television, a smart phone, a personal computer, a tablet computer, and a cloud system personal terminal.

Embodiment 4

This embodiment provides an intelligent television terminal, including a program embedded therein to implement the inter-process communication method based on an application layer of Android or the basic application communication system according to Embodiment 1. By running the program, mutual communication among applications in the intelligent terminal can be implemented. Based on the basic application communication system, the development of third-party user applications is facilitated, thereby achieving the objective of diversified applications. For example, a third-party developer even can invoke some interfaces of the system by simply performing two steps without having to understand the framework. For example, for third-party applications such as iQiYi and YouPeng in the existing Skyworth's Tianci system, same functions such as "add to favorites on cloud" can be easily and quickly implemented for different applications.

Embodiment 5

It should be appreciated by a person skilled in the art that some or all of the steps of the methods according to the implementation manners may be implemented by a computer program instructing relevant hardware. This embodiment provides a computer-readable electronic data carrier, including, but not limited to, an optical disc, a flash drive, a hard disk and a web disk. The electronic data carrier includes a computer program stored therein to implement the inter-process communication method based on an application layer of Android or the basic application communication system according to Embodiment 1. The electronic data carrier can be used for personalized upgrade of the operating system of an Android-based intelligent terminal, and also can be used for development of third-party applications. The intelligent terminal includes, but is not limited to, an intelligent television, a smart phone, a personal computer, a tablet computer, and a cloud system personal terminal Although the present invention is described in further detail above with reference to specific preferred implementation manners, the specific implementation of the present invention should not be construed as being limited to the descriptions. A person of ordinary skill in the art can make various simple modifications or replacements without departing from the concept of the present invention, and such modifications and replacements should be construed as falling within the protection scope of the present invention.

What is claimed is:

1. An inter-process communication method based on an application layer of Android, wherein frame encapsulation applications for mutual communication between system-level applications and user applications are created and virtualized as a client side; a daemon process IPC Service used for an inter-process communication service is created and virtualized as a server side; and the frame encapsulation applications are registered with and bound to the daemon process IPC Service, so that the frame encapsulation applications implement mutual communication among the system-level applications and the user applications by using the daemon process IPC Service;

the method specifically comprises:
implementing, by the frame encapsulation applications, service binding, object saving, data sending and data receiving steps; and
managing, by the daemon process IPC Service, all application services, saving package names of all communication applications, and mapping the package names of the frame encapsulation applications to Binder references on a one-to-one basis, to implement any package-to-package communication; and responding to requests of all the frame encapsulation applications and assigning corresponding services to the frame encapsulation applications, and when receiving the request of the application, acquiring a requested Binder reference according to the package name, then calling an interface of the Binder, and forwarding data;
wherein in the service binding step, when an activity and a service is created, the application sends a request to ServiceManager to apply for a service of the daemon process IPC Service, and by using a Binder mechanism, ServiceManager binds a service mechanism between the application and the daemon process IPC Service;
wherein a specific procedure of the service binding comprises:
S11. the daemon process IPC Service applies, in an own process thereof, to a Binder driver for creating a Binder entity of the daemon process IPC Service;
S12. the Binder driver creates, for the daemon process IPC Service, a Binder entity node and a Binder reference for the daemon process IPC Service in a kernel, that is, instructs ServiceManager to register a daemon process IPC Service used for the inter-process communication service;
S13. after receiving a data packet, ServiceManager extracts a name and reference of the IPC Service from the data packet, and fills the name and reference into a lookup table; and
S14. the application initiates a request to ServiceManager to apply for a service of the daemon process IPC Service, and ServiceManager finds, in the lookup table, a reference of the daemon process IPC Service, and returns the Binder reference to the application.

2. The inter-process communication method based on an application layer according to claim 1, wherein in the object saving step, after the service binding to the daemon process IPC Service succeeds, the application saves instance objects inheriting from an activity and a service into a correspondence table, so that when data is received, the data can be distributed to specific activities and service objects.

3. The inter-process communication method based on an application layer according to claim 2, wherein in the data receiving step, after receiving a data packet, the application places the received data packet into a command pool for processing received data packets, and a thread acquires data packets from the command pool, parses headers of the data packets, obtains, according to specific activity names or service names, specific activity instances from the correspondence table, and then sends the specific data packets to the specific activity instances for processing.

4. The inter-process communication method based on an application layer according to claim 2, wherein a specific procedure of sending data by an application A to an application B comprises: the application A sends a service request to the daemon process IPC Service; and when receiving the request from the application A, the daemon process IPC Service processes a header of the received data packet, parses out an object to which the data packet is to be sent, that is, the application B, and then acquires a Binder reference of the application B from a stored call table, and calls the reference of the application B, thus sending data to the application B.

5. The inter-process communication method based on an application layer according to claim 1, wherein a specific procedure of the data sending comprises: the application encapsulates data to be communicated into a data structure that comprises a header and a body, and sends an encapsulated data packet to the daemon process IPC Service, and then the daemon process IPC Service processes and forwards the data packet.

6. The inter-process communication method based on an application layer according to claim 5, wherein the header comprises the following fields: from, to, cmd, priority, and needack, wherein
- the "from" field comprises a package name and an activity or service name of a data sender, and is automatically assembled and acquired by the application layer;
- the "to" field refers to that data needs to be sent to an activity or service in a package, and an argument is transmitted by a specific user that implements a sending command;
- the "cmd" field represents an agreed protocol used by two parties to communicate;
- the "priority" field represents a priority of a command, and distinguishes a priority when the daemon process IPC Service processes a command;
- the "needack" field is an identifier indicating whether an instant reply is needed.

7. An Android-based basic application communication system, comprising:
- applications, being frame encapsulation applications for mutual communication between system-level applications and user applications, and virtualized as a client side;
- a daemon process IPC Service, used for an inter-process communication service, and virtualized as a server side, where
- the frame encapsulation applications are registered with and bound to the daemon process IPC Service, so that the frame encapsulation applications implement mutual communication among the system-level applications and user applications by using the daemon process IPC Service;
- wherein the frame encapsulation applications are configured to implement service binding, object saving, data sending and data receiving steps; and the daemon process IPC Service manages all application services, saves package names of all communication applications, and maps the package names of the frame encapsulation applications to Binder references on a one-to-one basis, to implement any package-to-package communication; and responds to requests of all the frame encapsulation applications and assigns corresponding services to the frame encapsulation applications, and when receiving the request of the application, acquires a requested Binder reference according to the package name, then calls an interface of the Binder, and forwards data;
- wherein in the service binding step, when an activity and a service is created, the application sends a request to ServiceManager to apply for a service of the daemon process IPC Service, and by using a Binder mechanism, ServiceManager binds a service mechanism between the application and the IPC Service;
- wherein a specific procedure of the service binding comprises:
- S11. the daemon process IPC Service applies, in an own process thereof, to a Binder driver for creating a Binder entity of the daemon process IPC Service;
- S12. the Binder driver creates, for the daemon process IPC Service, a Binder entity node and a Binder reference for the daemon process IPC Service in a kernel, that is, instructs ServiceManager to register a service that is called the daemon process IPC Service and used for the inter-process communication service;
- S13. after receiving a data packet, ServiceManager extracts a name and reference of the daemon process IPC Service from the data packet, and fills the name and reference into a lookup table; and
- S14. the application initiates a request to ServiceManager to apply for a service of the daemon process IPC Service, and ServiceManager finds, in the lookup table, a reference of the daemon process IPC Service, and returns the Binder reference to the application.

8. The basic application communication system according to claim 7, wherein in the object saving step, after the service binding to the daemon process IPC Service succeeds, the application saves instance objects inheriting from an activity and a service into a correspondence table, so that when data is received, the data can be distributed to specific activities and service objects.

9. The basic application communication system according to claim 8, wherein in the data receiving step, after receiving a data packet, the application places the received data packet into a command pool for processing received data packets, and a thread acquires data packets from the command pool, parses headers of the data packets, obtains, by query according to specific activity names or service names, specific activity instances from the correspondence table, and then sends the specific data packets to the specific activity instances for processing.

10. The basic application communication system according to claim 8, wherein a specific procedure of sending data by an application A to an application B comprises: the application A sends a service request to the daemon process IPC Service; and when receiving the request from the application A, the daemon process IPC Service processes a header of the received data packet, parses out an object to which the data packet is to be sent, that is, the application B, and then acquires a Binder reference of the application B from a stored call table, and calls the reference of the application B, thus sending data to the application B.

11. The basic application communication system according to claim 7, wherein a specific procedure of the data sending comprises: the application encapsulates data to be communicated into a data structure that comprises a header and a body, and sends an encapsulated data packet to the daemon process IPC Service, and then the daemon process IPC Service processes and forwards the data packet.

12. The basic application communication system according to claim 11, wherein the header comprises the following fields: from, to, cmd, priority, and needack, wherein
- the "from" field comprises a package name and an activity or service name of a data sender, and is automatically assembled and acquired by the application layer;
- the "to" field refers to that data needs to be sent to an activity or service in a package, and an argument is transmitted by a specific user that implements a sending command;
- the "cmd" field represents an agreed protocol used by two parties to communicate;
- the "priority" field represents a priority of a command, and distinguishes a priority when the daemon process IPC Service processes a command;
- the "needack" field is an identifier indicating whether an instant reply is needed.

13. An intelligent television terminal, comprising the Android-based basic application communication system according to claim 7 built therein.

* * * * *